Feb. 7, 1939.  F. BISZANTZ  2,146,106
AUTOMOTIVE BODY AND STORAGE LOCKER CONSTRUCTION
Filed March 9, 1938  4 Sheets-Sheet 1
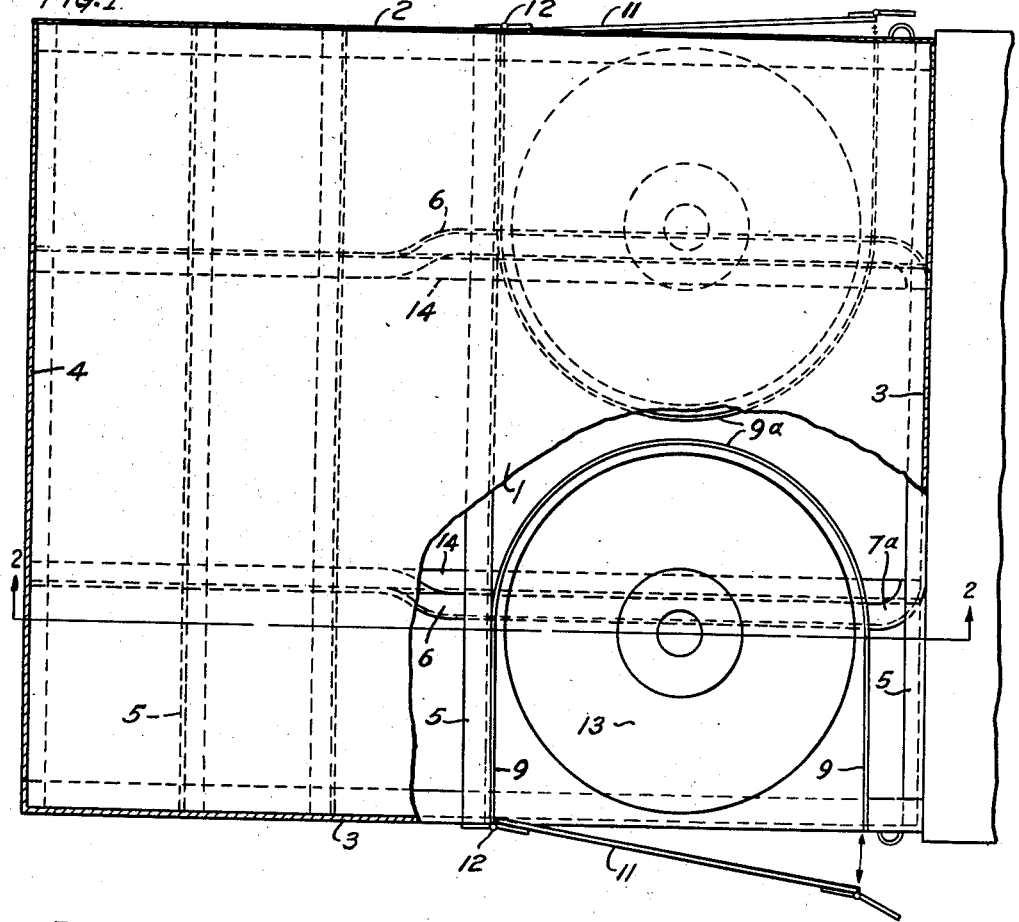
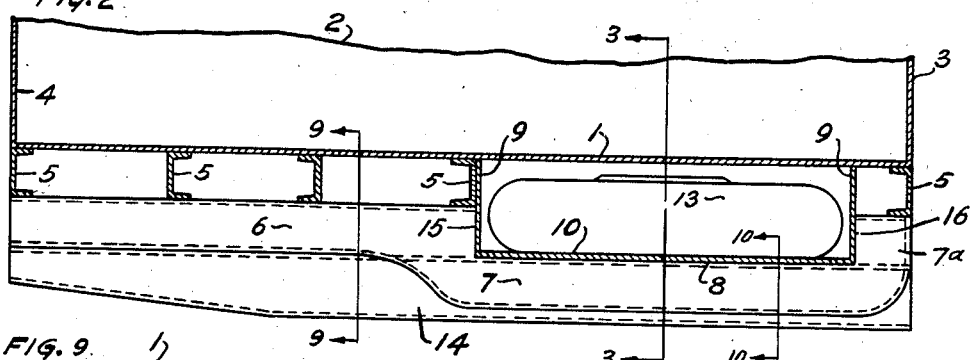
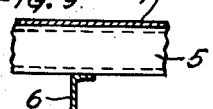
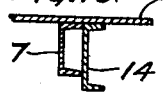
INVENTOR
FRED BISZANTZ
BY
ATTORNEYS

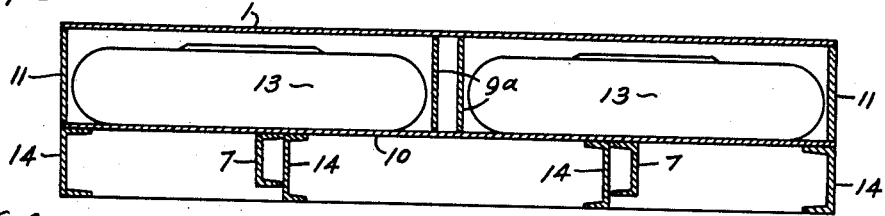
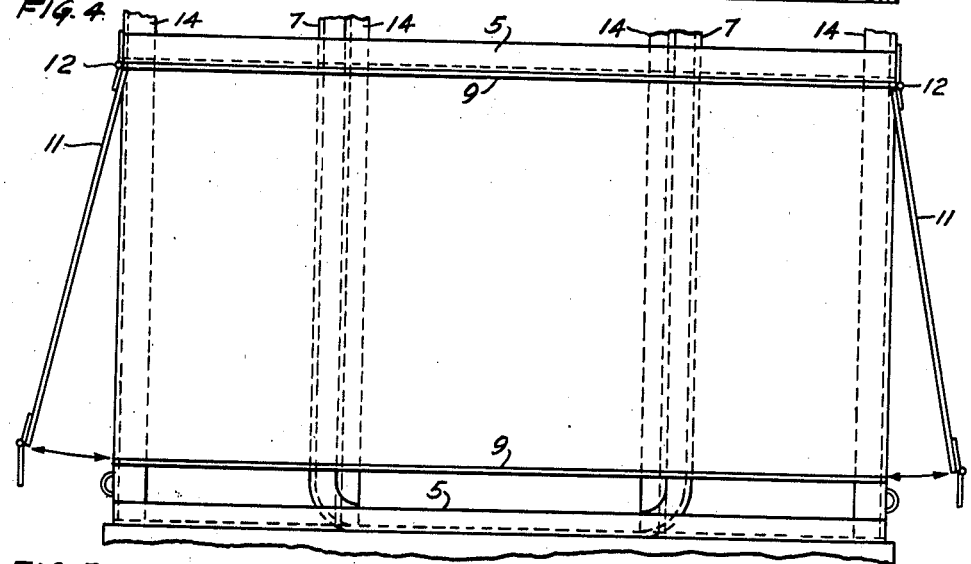
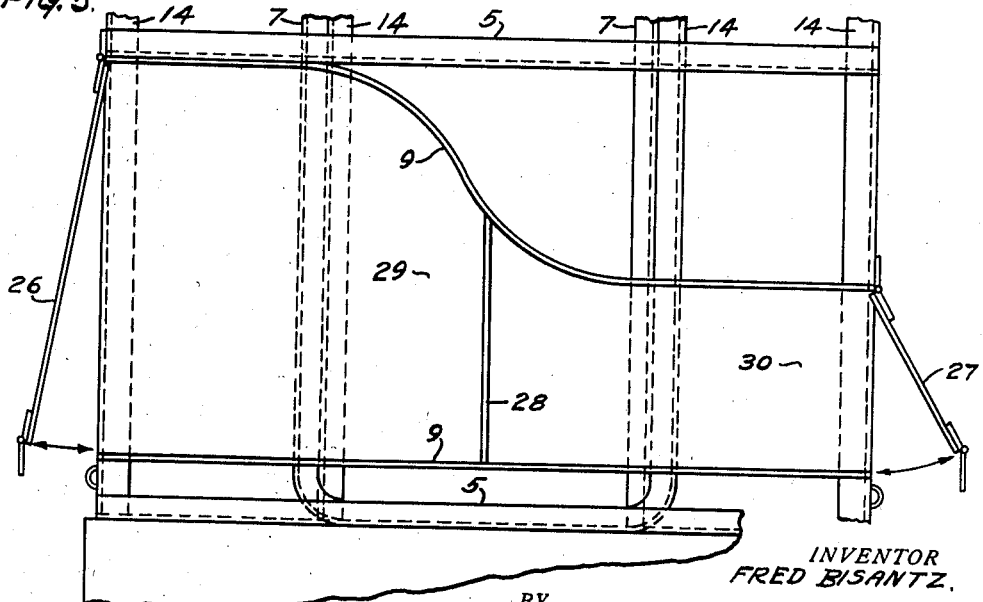

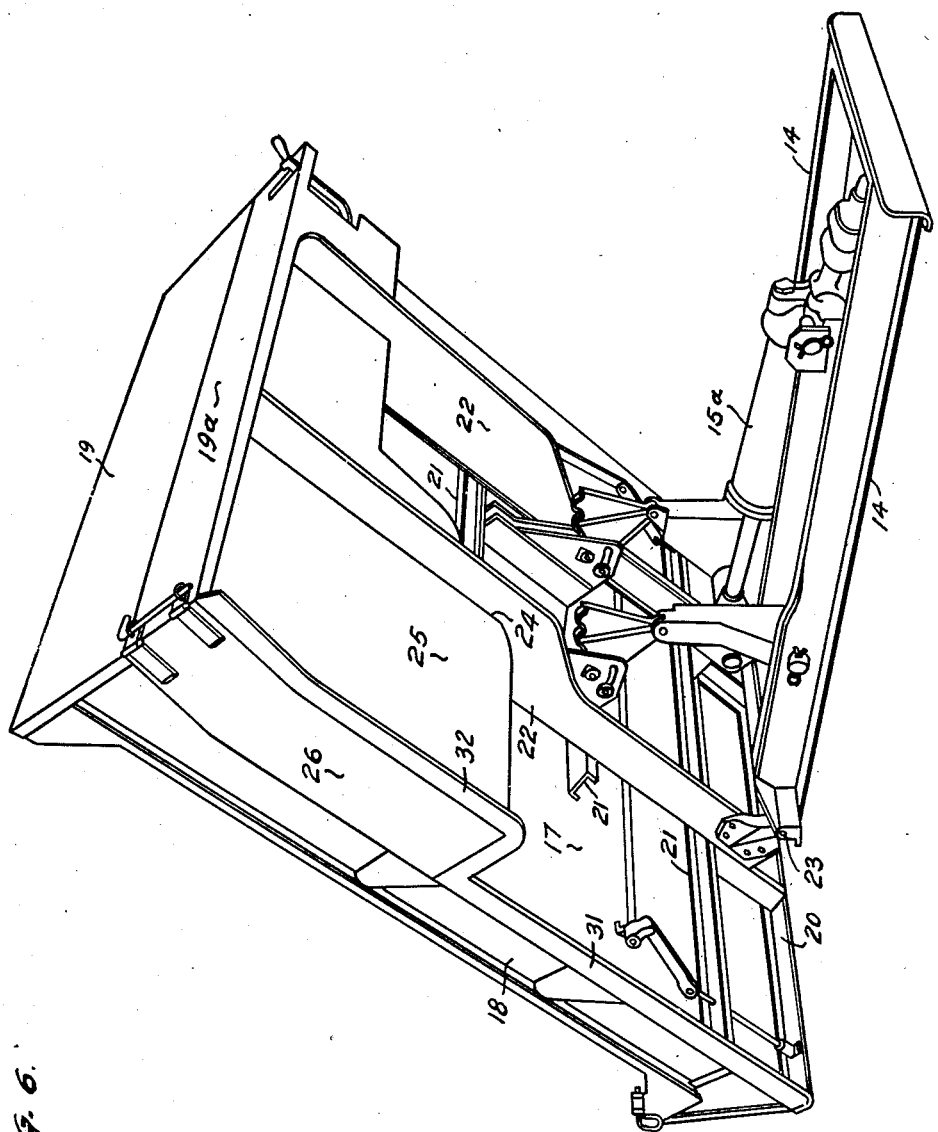

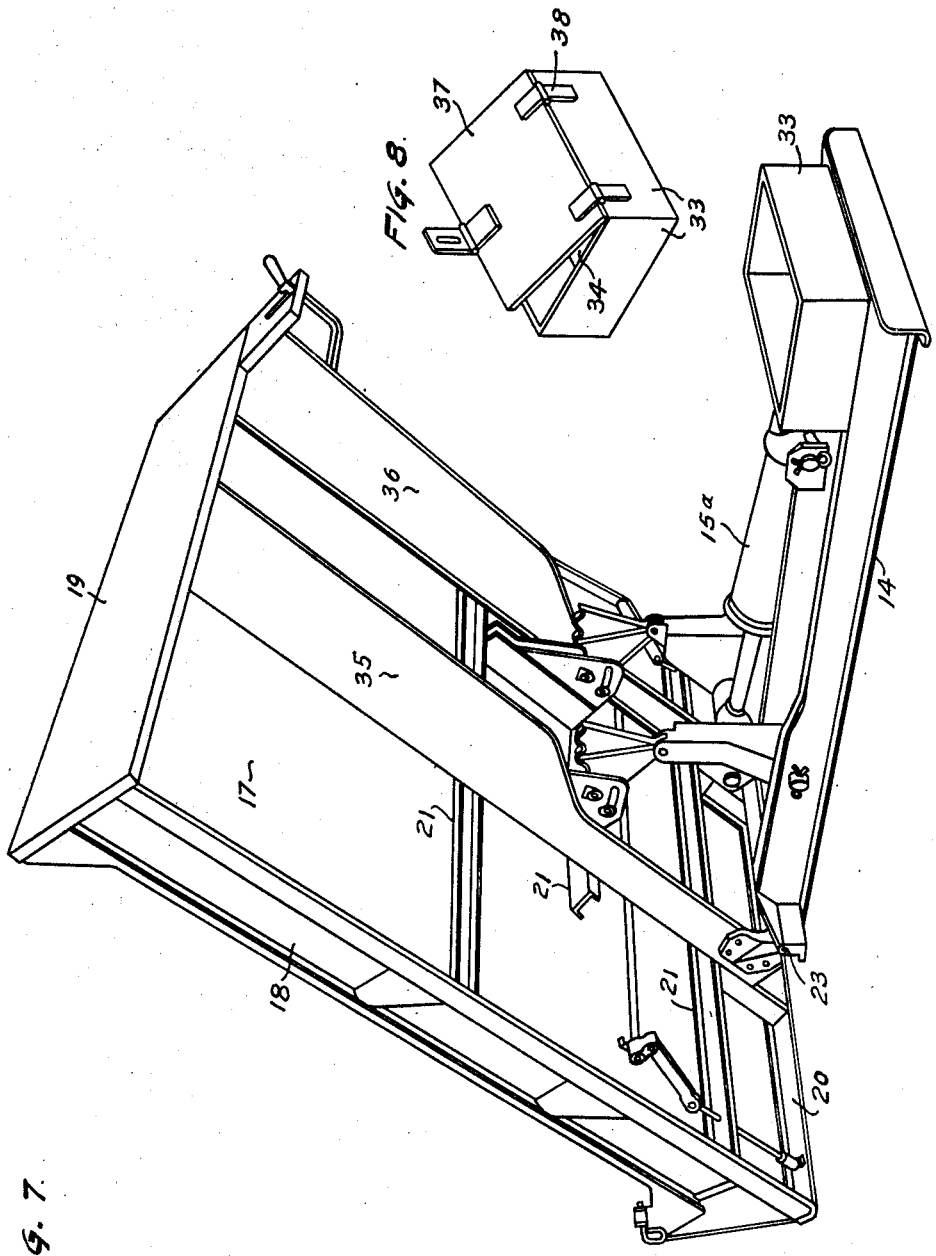

Patented Feb. 7, 1939

2,146,106

UNITED STATES PATENT OFFICE 2,146,106

AUTOMOTIVE BODY AND STORAGE LOCKER CONSTRUCTION

Fred Biszantz, Galion, Ohio, assignor to The Galion Metallic Vault Company, Galion, Ohio, a corporation of Ohio Application March 9, 1938, Serial No. 194,937

4 Claims. (Cl. 296—37)

My invention relates to vehicles and vehicle bodies, and in particular, to cargo carrying bodies having associated therewith storage compartments.

It is the object of this invention to provide with a stationary body a storage compartment for tires, tools and the like, which is so arranged as to fit between the body and the truck frame and within the body supporting frame without changing the relationship of the body with respect to the truck frame. Heretofore there has been no satisfactory means of carrying a spare tire on a truck with a cargo carrying body, both for lack of space and because of the inconvenience or injury to the tire. When a tire is carried behind the cab of a truck, it is both exposed to the elements, which is injurious to the tire, and the body is shortened a corresponding amount according to the thickness of the tire and its support. If the tire is carried on top of the cab, it is not only injured by the elements, but prevents the cab from passing into the doorways of garages and the like where the clearance between the top of the door opening and the top of the cab is limited. If the tire is carried alongside of the hood, it is not only subjected to the elements but to the deteriorating effect of the heat from the engine and is in such an awkward position that it is difficult to get at the engine.

The present invention eliminates these difficulties by placing the tire in a storage compartment where it is completely concealed and protected from the elements and from light. It does not impede the operation of the vehicle. It can be locked in a compartment so it can not be stolen and in such a position that it does not interfere with the operation of the truck or the capacity of the body.

It is readily accessible from either side of the vehicle. The container for the tire or tools is so arranged as to reinforce and strengthen the body and the framework supporting the body so that the resulting structure is stronger than it was before this construction was embodied in it.

It is an additional object of this invention to provide a horizontally disposed tool space for the carrying of automobile tools, excavation tools, tow ropes and the like associated with bodies for hauling various types of granular materials.

It is an additional object of this invention to provide this arrangement with a tool box or combined tool box and tool carrier with tilting dump bodies which may either have separate enclosures or be enclosed when the bottom of the body is in its horizontal position.

Referring to the drawings:

Figure 1 is a top plan view of a stationary body with its bottom partly broken away to expose the interior of one of the tire compartments.

Figure 2 is a section on the line 2—2 of Figure 1, looking in the direction of the arrows.

Figure 3 is a section on the line 3—3 of Figure 2, looking in the direction of the arrows.

Figure 4 is a top plan view of a modified form of compartment for tires or tools carried beneath the frame of the truck body with one wall removed to show the interior thereof.

Figure 5 is a top plan view of a modified form.

Figure 6 is a perspective of a tilting body with a tire and tool carrying box associated with the bottom thereof of the form and shape shown in Figure 5.

Figure 7 is a perspective of a tilting body with its frame and the truck frame with a tool box stationarily mounted upon the truck frame adapted to be enclosed within the frame members of the body and to have its open top closed by the bottom of the body.

Figure 8 is a perspective of an alternate form of box to be used with the construction of Figure 7, but which has its own independent locked top.

Figure 9 is a section on the line 9—9 looking in the direction of the arrows on Figure 2.

Figure 10 is a section on the line 10—10 of Figure 2, looking in the direction of the arrows.

In my co-pending applications Serial Nos. 170,437, 199,213 and 199,214, I have shown, described and claimed several other embodiments of my invention from those herein described and claimed.

Referring to the drawings in detail, 1 designates the bottom of a stationary body having side walls 2 and 3 with end walls 3 and 4. This body is mounted upon cross frame members 5 of which there are a number arranged transversely of the body on the under side thereof. These cross frame members are in turn mounted upon spaced longitudinal body frame members 6. These longitudinal frame members are dropped down as at 7 to form a space between the top thereof at 8 and the bottom 1 of the body. In this space is fitted transversely arranged compartments consisting of side walls 9 and bottom walls 10. The tops of the compartments are closed with the bottom 1 of the truck body.

This compartment wall 9 may be U-shaped at its inner end as at 9a or the compartment may extend completely across and beneath the truck body, as in Figures 4 and 5. The outer open ends of the compartments thus formed are closed by doors 11 hinging at 12 upon any suitable form of hinge. Access to the compartments is thus obtained from either side or from both sides of the vehicle. The compartments are large enough to receive and retain a tire 13 or tools.

In the form shown in Figures 1, 2, 3, 4, 5, 9 and 10, the body frame rests upon and engages within superimposed and in overlapping arrangement the truck frame 14. It will be noted in Figure 9 that the transverse body frame member 5 is mounted upon the longitudinal frame member 6, which at its forward end rests upon the truck frame member 14 and is either bolted or welded thereto.

At the rear portion of the frame member 6 it drops down at 7 (see Figure 10) and is in overlapping engagement with the outside of the truck frame member 14, to which it is bolted or welded. This prevents lateral shifting. The extreme end of the longitudinal body frame member 6—7 turns upwardly as at 7a and overlaps the top of the truck frame member 14 and supports the cross frame member 5 for supporting the rear end of the body. The shoulders thus formed at 15 and 16 in this longitudinal frame member 6—7—7a form a positioning pocket for positioning the compartment between the bottom of the body and the top of this frame member.

Referring to Figures 4 and 5 which show alternative types of cabinets to that shown in Figures 1 and 2, in Figure 4, which is a top plan view, there is a continuous compartment completely across the vehicle formed by the front and rear walls 9 and closed on the sides by the doors 11. In Figure 5, these walls 9 are at varying distances with respect to one another to form a large compartment 29 on one side, and a small compartment 30 on the other. The compartments may be separated by the partition 28.

A large door 26 closes one compartment and a small door 27 closes the other compartment. In Figure 6 there is shown the same sort of compartment as in Figure 5, but mounted upon a tilting body, as hereinafter or specifically described.

Turning to the alternative forms in Figures 6 and 7 will be seen a tilting body comprising a bottom 17, side walls 18 and front and rear walls 19 and 20. This body is provided with transverse frame members 21 and longitudinal frame members 22. The body is pivoted at 23 to the truck frame 14 which carries the elevating mechanism generally designated 15a. The longitudinal frame members overlap on either side of the truck frame members 14. They are cut away as at 24 to receive the bottom 25 of a compartment which is either the same size completely across the truck body, as in Figure 4, or is broader at one end than the other, as in Figures 5 and 6.

The end wall 19a of the truck body forms the end wall of the compartment, whose bottom is marked 25. The ends of the compartment are closed with the doors 26 and 27. The compartment may be separated by a partition 28 into a large chamber 29 and a small tool carrying chamber 30. The outside frame members 31 may be dropped down at 32 to form a marginal frame for the end of the compartment to furnish a satisfactory abutment for the closing of the doors 26 and 27.

The top of the compartment, or compartments, thus formed is formed by the bottom 17 of the tilting body. In Figures 7 and 8 will be seen a tool carrying box having side walls 33 and a bottom 34. In Figure 7 the top of the box is closed when the tilting body is lowered by the bottom 17 of the body. In such an event, access to the box is prevented by the body frame members 35 and 36 which, in this instance, are not cut away. If desired, however, a locked top 37 may be hinged, as at 38, to the box walls 33 to independently close it and prevent the theft of tools.

It therefore will be seen that the underlying principle of this invention is the provision of an article compartment between the bottom of the truck body and the truck frame and preferably within the body frame in such a manner as to reinforce said frames and said body and to group therewith in such a manner as to strengthen these several parts while at the same time providing an adequate compartment for protecting and safeguarding tools without decreasing the body capacity, without changing the body height and without interfering with the arrangement of and other parts of the truck or interfering with their convenient use.

It will be understood that I desire to comprehend within my invention such modifications as may be necessary to adapt it to varying conditions and uses.

Having thus fully described my invention, what I claim as new and desire to secure by Letters Patent, is:

1. In combination, a truck frame, a body frame mounted thereon and engaging therewith, a body mounted on said body frame, said body frame and truck body being so arranged as to form a space therebetween for a storage compartment, and means forming a storage compartment supported by said body frame and engaging with said body, said body frame having longitudinal members supported upon said truck frame in part and having a portion overlapping and disposed laterally of said truck frame to form a lowered portion to provide space for receiving said compartment between it and the bottom of said body.

2. In combination, a truck frame comprising longitudinal members, a body frame comprising longitudinal members partly superimposed at either end upon said truck frame and partly overlapping and laterally disposed of said truck frame intermediate the body frame ends, transverse body frame members mounted at intervals upon the longitudinal body frame members, a body mounted thereon and means located between the bottom of said body and the top of the depressed portions of said longitudinal body frame members for forming a storage compartment.

3. In combination, a truck frame comprising longitudinal members, a body frame comprising longitudinal members partly superimposed at either end upon said truck frame and partly overlapping and laterally disposed of said truck frame intermediate the body frame ends, transverse body frame members mounted at intervals upon the longitudinal body frame members, a body mounted thereon and means located between the bottom of said body and the top of the depressed portions of said longitudinal body frame members for forming a storage compartment, the top of which is formed by the bottom of said body.

4. In combination, truck frame members, a body, longitudinal frame members mounted on the bottom thereof and partly spaced therefrom by being dropped for a portion of their length and overlapping the truck frame members, means to form a compartment between said frame members and body where the frame members are spaced therefrom, and means to close the end of said compartment on either side of said body.

FRED BISZANTZ.